Figure 2:
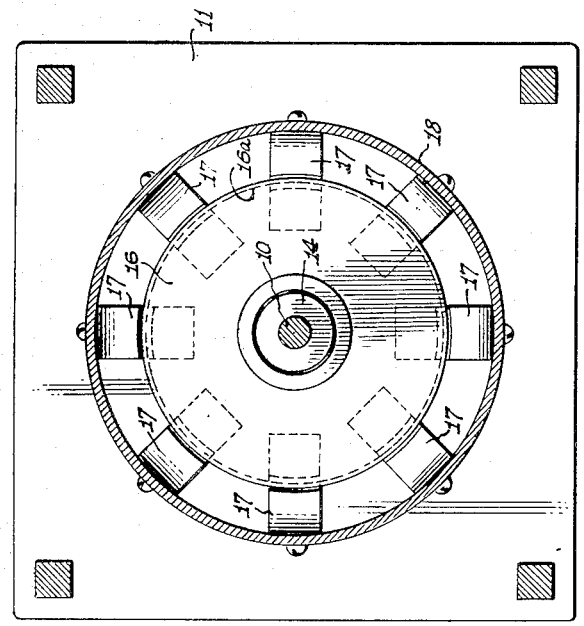

March 13, 1934.     H. E. NICHOLS     1,950,810
CONSTANT SPEED MECHANISM
Original Filed May 4, 1927

Inventor
Horace E. Nichols,
by
Attys.

Patented Mar. 13, 1934

1,950,810

UNITED STATES PATENT OFFICE 1,950,810

CONSTANT SPEED MECHANISM

Horace E. Nichols, Detroit, Mich., assignor of one-third to Clyde Harrison Chase and one-third to Hugo A. Freund, both of Detroit, Mich.

Original application May 4, 1927, Serial No. 188,839. Divided and this application April 17, 1933, Serial No. 666,499

19 Claims. (Cl. 172—284)

The present invention relates to improvements in constant speed mechanisms, such, for instance, as may be advantageously used in connection with electrocardiographs, heliographs, heliotropes, and other types of light flashing apparatus. For instance, in an electrocardiograph a light beam is projected on a mirror and reflected through a driven slitted shutter or flasher on to a sensitized film, and a motor or other source of power is employed for revolving the apertured shutter or flasher. Such an instrument is employed for making a visible and permanent record of heart actions and consequently the speed at which the apertured shutter or flasher is revolved must be constant in order to determine time intervals throughout a diagnosis of the action of the heart. Other instances of timing may be in connection with the interruption or reflection of light beams, the operation of clock dials and time switches, and the controlling of relays and of maximum demand meters.

The driving of such shutter, for instance, from a power source and in synchronism with the latter, would be a simple matter of proper gear relationships, if the speed of the power source were assuredly constant in rate, so as to present no variation in the rate of speed. The difficulty arises because of the condition that power source operation has not reached a stage of development where the exact constancy in rate of speed is present, although the variations in rate may be small. Under most conditions of operation these minor variations become unimportant, but in structures of the type above referred to it is essential that the records obtained be accurate, and to produce this result it becomes necessary that the rate of speed of the driven element—the shutter, for instance—be constant with exactness, if possible, regardless of power variations in speed, and it is to meet this condition that the present type of invention has been developed, it being designed to interpose, within the line from the driving structure to the driven member or element, a mechanism which will automatically detect and to compensate for the rate changes. It should be noted that the rate variations referred to are not those which come from adjustment of the power source itself—these latter are not being considered so far as the present invention is concerned; the variations referred to are those inherently present when the power source is operating at an assumed constant speed, and are variations which are small as a general rule, but which, in the production of an accurate record, for instance, would materially affect the accuracy of the record.

The present application is a division of an application filed May 4, 1927, Serial No. 188,839, patented April 18, 1933, No. 1,903,832 in which the structure herein disclosed is one of the modifications disclosed therein, the general principles underlying the solution of the particular problems involved, being capable of being employed in structures of different types, one of which is that disclosed in the present invention. The parent application discloses more particularly the detailed characteristics of the problem to be solved and the general methods employed in its solution, and this detailed explanation is not repeated herein. For the purpose of a general explanation, however, a brief synopsis of the fundamentals of the solution are presented herein, to permit a clearer understanding of the present invention and its particular manner of solving the general problems involved.

The underlying features of the general solution may be briefly stated as follows:

If the operating connections between the drive source and the driven element be of fixed character, it is evident that any variations in speed rate of the drive source are necessarily made manifest on the driven member; if the proportional speed between the two elements be amplified, any inaccuracies in the rate of the drive source will be amplified in the driven element, and vice versa. To correct this condition, this general solution of the problem contemplates the location within this line of operating connections of a mechanism which will instantly detect the presence of such variations in the rate of speed of the drive source and set in motion a change in conditions within the connections such as will so vary the operation of the connections that the rate of speed of the driven element will not be changed. In other words, no attempt is made to change the operation of the power source—the correction is made within the connections between such source and the driven element.

Fundamentally, this result is produced by placing within the line of connections a mechanism which presents the drive and driven parts as in more or less opposition and to then set up the development of a differential action characteristic between them. This may take the form of using an actual differential mechanism structure within the connections and employing a controlling mechanism for the differential on the power side of the differential, the control mechanism being operative on the differential; such structure forms the subject-matter of a companion application filed concurrently herewith, Serial No. 666,497. Or it may be in the form of a structure in which the control mechanism itself performs the function of the differential action, this particular development being found in a number of forms, one of which is disclosed and claimed in the parent application, a second form being disclosed in my companion application filed concurrently herewith, Serial No. 666,498, and a third forming the subject-matter of the present application.

The structures of the companion applications each involve the use of a fixed load characteristic on one side and a variable load characteristic on the opposite side of an intermediate portion of the connections, these two load conditions being effective in the operation of the control mechanism and in which the variations in speed are operative to control the variations of the variable load. These loads are in the form of magnetic fields in which are mounted elements in such manner that a relative movement of the elements within the field can be had. In the fixed load condition, the element is rotative at a constant speed so that the load remains constant; in the variable load the element is movable in such manner that the number of lines of force of the field cutting the movable element are varied and thus affect the retardation value of the field on the element and consequently the load value of the field and element. The third element is a control mechanism between the two loads, and which is active in varying the variable load by the variations in speed of the drive source; this control mechanism is of various types, and detects the presence of the rate changes, and by varying the variable load produces the compensation that is necessary to preserve the constancy in the rate of speed of the driven element.

In the present invention, the same general results are obtained, but the arrangement differs somewhat in that both the constant and the variable loads are on the same side of the control mechanism, the latter being located between the power and the variable load.

The present invention therefore consists in the improved construction and combination of parts, hereinafter described, illustrated in the accompanying drawing, and more particularly pointed out in the appended claims.

Figure 1:
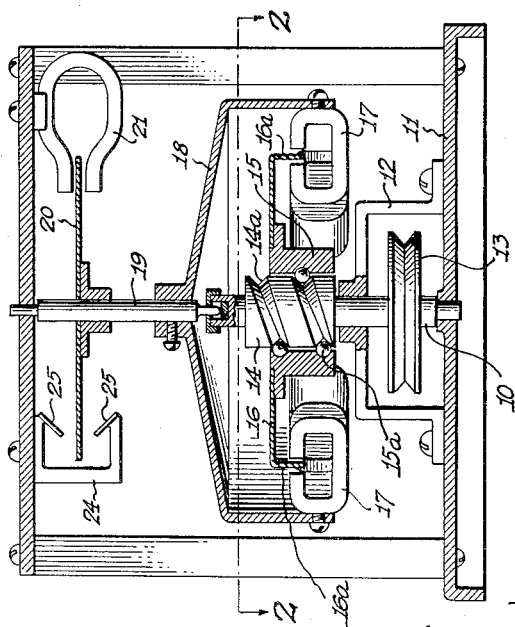

In the accompanying drawing, in which similar reference characters indicate corresponding parts in each of the views:

Figure 1 is a vertical sectional view, partly in elevation, of the particular embodiment of the invention disclosed herein, and Fig. 2 is a sectional view thereof on line 2—2 of Fig. 1.

In the drawing, 10 indicates what may be termed the drive shaft, this extending vertically from a base 11, a bracket 12 forming a bearing support for the shaft. The shaft is driven from a suitable source and in suitable manner, a pulley 13 being shown as the means by which the shaft is rotated. The shaft carries one of the elements of what I term an electromagnetic governor, this element being in the form of a screw 14 having coarse threads 14a. Co-operating with this screw is a nut 15, the interior of which is adapted to co-operate with the threads 14a, as by the presence of balls 15a which enter the threads 14a.

The nut 15 carries a plate 16 having a downwardly-projecting flange 16a, the nut and plate forming what I term a drag member which, in connection with the screw, sets up a sensitive governing action when employed with the structure presently described. With the parts at rest, for instance, rotation of shaft 10 will initially cause the threads 14a to raise the nut, since the latter is at a state of rest. As the nut raises, however, its weight becomes effective to produce the effect of "running down hill" with the result that the nut will be rotated although there is no direct drive connection therebetween. While the nut can attain a speed to overrun the shaft, due to the weight factor of the nut, it can be understood that if the speed of the nut can be limited relative to the shaft speed, the nut can take up a position of equilibrium relative to the screw with the nut and screw traveling at a synchronous speed relation. And, if the drag characteristic which forms the speed-limiting factor of the nut, is variable, the position of equilibrium of the nut is also variable.

The latter condition is produced by providing a succession of pole pieces 17, these being shown as in the form of permanent magnets having opposed poles with a gap between the poles, these pole pieces being of suitable number and arranged in a circular series, as indicated in Fig. 2. The plate 16 with its flange 16a is of non-magnetic material, and, in operation, the flange is operative relative to the gap between the poles. As will be obvious, the greater the number of magnetic lines of the magnetic field of the gaps which may be cut by the flange 16a, the greater will be the drag effect present on the nut.

In the present form of the invention, the magnets are carried by an inverted cup-shaped member 18 mounted on what may be termed the driven shaft 19, the latter being supported in suitable manner, as by bearings, one of which may be a bearing at the upper end of the drive shaft 10, the two shafts being free to rotate relatively. Shaft 19 also carries a plate 20 which extends into the gap between the poles of a permanent magnet 21, the latter constituting the fixed load of the structure, since the load value is constant.

As will be understood, the pole pieces 17 and flange 16a provide the characteristics of the variable load, since the position of the flange 16a is variable in the magnetic field. For instance, with the parts at rest, and shaft 10 beginning its rotation, the immediate effect is to raise the nut 15; the latter may move the flange out of the magnetic field, thus permitting the gravitation effect of the weight of the nut to cause the latter to try to "run down" by overrunning the speed of the screw. As soon as the flange enters the magnetic field, the drag effect of the latter affects the speed of the nut, with the result that there is a tendency to produce the conditions of a point of equilibrium between nut and screw, this point being automatically determined by a tendency to balance the forces involved.

However, an additional factor is presented by the fact that the pole pieces are also capable of being moved in the circular path, being carried by the rotatable shaft 19, so that the drag effect set up by the movement of flange 15a within the gaps tends to set up movement of the pole pieces in the circular path, the slippage condition present being determined by the amount of magnetic or torque reaction being produced by the co-operating poles and flange. Since the slippage becomes less pronounced as the speed of the driven shaft increases, the effect is carried into the relations of nut and screw, until the driven shaft 19 reaches its desired speed which is determined by the fixed load. During this development, the nut will gradually work to a position of equilibrium determined by all of the factors, at which time the driven shaft will be rotated at the desired speed by the drive shaft and will continue to do so as long as the speed of the drive shaft remains constant.

However, the speeds of power sources may vary, even though slightly, and it is to meet this condition that the present type of invention is utilized, since it is essential that the driven shaft be rotated at unvarying speed. This result is obtained in the present invention. For instance, should the speed of the drive shaft increase, this fact will be instantly manifest through the increase in speed of the screw, with the consequent effect of tending to raise the nut and decreasing the magnetic or torque reaction present, thus disturbing the point of equilibrium which the nut will seek to restore. Should the speed of the drive shaft decrease, the gravitation effect becomes immediately effective to increase the magnetic or torque reaction effect and thus hold the driven shaft to its speed. In each case, steady running of the drive shaft after the change sets up the conditions of equilibrium to continue the unvarying rotation of the driven shaft. Since the combined action of the threads and the weight of the nut are constantly active to detect speed changes of the drive shaft, and the position of the nut is responsive to the conditions produced by the change, with the position of the nut active in determining the magnetic or torque reaction, it can be readily understood that the governor effect set up is exceedingly sensitive to speed changes even though the latter be slight, with the response made with such rapidity that the speed of the driven shaft remains unaffected by the speed change of the drive shaft.

In other words, the structure is designed more particularly to meet the conditions of small variations in drive speed and produce instantaneous response. For the particular service for which the invention is designed, in which the slightest change in driven shaft speed could serve to affect the records being made, it can be understood that a highly sensitive governer be present as a part of the connections between the drive and driven shafts. The apparatus is generally employed under assumedly constant power speed conditions, so that any variations are generally small, but even these must be compensated for to obtain the desired records.

As will be understood, the torque reactions produced by the rotation of plates 16 and 20 in the respective magnetic fields differ in that the torque reaction in connection with plate 20 is constant while that of plate 16 is variable, thus producing the effect of fixed and variable loads.

Because of the particular mounting of nut 15 and the relation of its flange 16a with the magnetic field produced by the pole pieces 17, the nut and plate may be considered as a floatable member with the floating movements in a fixed path. Because of this characteristic there is no direct and positive drive connection between the two shafts, the drive being through the torque reaction effect produced by the rotation of the flange 16a within the gap between the pole ends. Hence, the drive action is through a floatable element having no fixed position relative to either the drive or driven elements, but is an element which is variable in position and constantly seeking a position of equilibrium through the activity of the various forces involved, the "hunting" effect being made manifest at all times during rotation of the drive shaft; if the speed of the latter is constant after equilibrium is reached, the equilibrium is not disturbed and "hunting" remains temporarily inactive, but the slightest change in drive shaft speed sets up the "hunting" characteristic.

As is clear, the torque reaction between plate 20 and its magnetic field prevents the momentum of member 18 from developing a condition disturbing to the operation. Hence, the magnetic field for flange 16a has a maximum speed of rotation, and whenever this is present it tends to prevent the nut from exceeding the relative speed essential in producing this effect. This drag effect causes the thread to tend to raise the nut, in the event of an increased speed of the drive shaft, and thus reduce the drag effect and permit greater slippage; if the drive shaft speed decreases, the tendency is for the nut to "run down" the thread, thus increasing the drag effect and reducing the slippage.

It will be understood, of course, that in service, the structure is permitted to develop the driven shaft speed to its proper point before the apparatus with which it is being used is rendered active for the making of the record. The drive shaft remains active until the record has been completed and the apparatus rendered inactive. Hence, the timing action, for which the structure is particularly adapted, takes place only during the period when the driven shaft is driven at the predetermined speed; when the structure is employed with a cardiograph, for instance, the period of recording may be a matter of minutes, during which period it is essential that the driven shaft speed be maintained constant.

The complete mechanism of the apparatus is not disclosed herein, although indicated in greater detail in the parent application, the present invention being more particularly to the sensitive drive connection between the shafts. However, for illustrative purposes, I have shown a bracket 24 carrying mirrors 25 adapted to project light rays through apertures in the plate 20 the latter having the characteristics of a shutter in the operation of the apparatus.

While I have herein shown and described a preferred form of the invention and a modification of the broad invention disclosed in the parent application, it is obvious that changes and modifications therein may be found desirable or essential in meeting the exigencies of use, and I desire to be understood as reserving the right to make any and all such changes or modifications as may be found desirable or necessary, insofar as the same may fall within the spirit and scope of the invention as expressed in the accompanying claims when broadly construed.

Having thus described my invention, what I claim as new is:

1. In timing mechanism wherein the speed of a driven shaft is maintained constant regardless of speed changes of the driving shaft, a driven shaft having a load of constant value to produce a torque reaction constant in value, a drive shaft, and means responsive to drive speeds of the drive shaft for automatically producing an independent torque reaction within the means with the value of the latter torque reaction determined by the speed of the drive shaft and variable in presence of drive speed variations and with such torque reaction compensatory to the speed variations, said means including a load active in producing the torque reaction and variable as to value by variations in drive speed, such load including a member and a magnetic field movable relatively to each other, and means for supporting said member on the drive shaft in such manner as to permit relative movement therebetween rotatively and axially during load production activity.

2. Mechanism as in claim 1 characterized in that the axis of member movement is vertical with the weight of the member providing a gravity component co-operative with the drive shaft speed in producing the relative movements of drive shaft and member.

3. Mechanism as in claim 1 characterized in that the supporting means for the member includes a pair of opposing faces movable relatively to each other helically about the drive shaft axis.

4. Means as in claim 1 characterized in that the supporting means for the member includes a pair of faces movable relatively to each other helically about the drive shaft axis, the axis of such faces extending vertically, the weight of the member and the drive shaft speed co-operating in the relative movements of the faces in the direction of the helix.

5. Mechanism as in claim 1 characterized in that the magnetic field is carried by and movable with the driven shaft.

6. Mechanism as in claim 1 characterized in that the magnetic field is carried by and movable with the driven shaft, movement of the magnetic field being provided by movements of the member through the torque reaction relation between member and field.

7. In timing mechanism and in combination, a driven shaft having a fixed load characteristic, a drive shaft, and means operatively connecting said shafts to produce driven shaft rotation at constant speed regardless of limited variations in speed of the drive shaft, said means including a magnetic field carried by and movable with the driven shaft, and a member carried by and floatable rotatively relative to the drive shaft, said member and magnet field being co-operative to provide a variable load characteristic by the relative rotation of drive shaft and member, the floating movements of the member being in a definite path.

8. A combination as in claim 7 characterized in that relative rotation of drive shaft and member is operative to shift the member axially of the drive shaft.

9. A combination as in claim 7 characterized in that relative rotation of drive shaft and member is operative to shift the member axially of the drive shaft and vary the relation of the member to the magnetic field.

10. A combination as in claim 7 characterized, in that the member includes a flange movable in the magnetic field rotatively and axially.

11. A combination as in claim 7 characterized in that the member includes a flange movable in the magnetic field rotatively and axially, the value of the flange activity with the field in producing the variable load characteristic being determined by the relative rotation of member and drive shaft.

12. A combination as in claim 7 characterized in that the member and drive shaft are operatively connected helically with the helix formation having a vertical axis, whereby gravitation of the member is active in providing relative rotational movement of drive shaft and member.

13. In combination, a rotatable driven element having a magnetic field, a drive shaft, and a member carried by and movable rotatively and axially relative to said shaft and being co-operative with said field in driving the driven element.

14. A combination as in claim 13 characterized in that the value of the drive activity between member and field is determined by the axial position of the member relative to the drive shaft.

15. A combination as in claim 13 characterized in that the value of the drive activity between member and field is determined by the axial position of the member relative to the drive shaft with such axial position determined by the relative rotation of drive shaft and member.

16. A combination as in claim 13 characterized in that the drive shaft and member are operatively connected to permit gravitational activity of the member in providing relative rotational movements therebetween.

17. A combination as in claim 13 characterized in that the member and drive shaft are operatively connected to permit relative rotation in a helical path.

18. A combination as in claim 13 characterized in that the member and drive shaft are operatively connected to permit relative rotation in a helical path with such path located to cause the weight of the member to provide relative rotation in one direction by gravitation.

19. A combination as in claim 13 characterized in that the member and drive shaft are operatively connected to permit relative rotation in a helical path with such path located to cause the weight of the member to provide relative rotation in one direction by gravitation, relative rotation in the opposite direction being provided by drive shaft rotation.

HORACE E. NICHOLS.